(12) United States Patent
Cruz et al.

(10) Patent No.: US 10,038,624 B1
(45) Date of Patent: Jul. 31, 2018

(54) FLEXIBLE PACKET REPLICATION AND FILTERING FOR MULTICAST/BROADCAST

(71) Applicant: Barefoot Networks, Inc., Palo Alto, CA (US)

(72) Inventors: John Cruz, Cupertino, CA (US); Chaitanya Kodeboyina, Los Altos, CA (US)

(73) Assignee: BAREFOOT NETWORKS, INC., Santa Clara, CA (US)

( * ) Notice: Subject to any disclaimer, the term of this patent is extended or adjusted under 35 U.S.C. 154(b) by 122 days.

(21) Appl. No.: 15/091,550

(22) Filed: Apr. 5, 2016

(51) Int. Cl.
*H04L 12/28* (2006.01)
*H04L 12/761* (2013.01)
*H04L 12/743* (2013.01)
*H04L 12/709* (2013.01)

(52) U.S. Cl.
CPC ............ *H04L 45/16* (2013.01); *H04L 45/245* (2013.01); *H04L 45/7453* (2013.01)

(58) Field of Classification Search
CPC .................. G06F 11/1464; G06F 11/20; G06F 17/30008; G06F 17/30126; G06F 17/302
See application file for complete search history.

(56) References Cited

U.S. PATENT DOCUMENTS

| 5,757,795 A * | 5/1998 | Schnell ................. H04L 45/745 370/392 |
| 7,110,404 B1 | 9/2006 | Temoshenko |
| 7,953,089 B1 * | 5/2011 | Ramakrishnan .... H04L 12/4641 370/392 |
| 2013/0279504 A1 * | 10/2013 | Gulati ..................... H04L 45/16 370/390 |

* cited by examiner

*Primary Examiner* — Jamal Javaid
(74) *Attorney, Agent, or Firm* — Adeli LLP

(57) ABSTRACT

A novel method for replicating and filtering multicast packet in a physical network is provided. Upon receiving a packet, the method generates a set of metadata as ingress replication context for the received packet based on the content of the receive packet. The generated ingress replication context includes a multicast group identifier, a replication identifier, a first layer exclusion identifier, and a second layer exclusion identifier. The method performs multicast replication of the packet by identifying logical ports and/or logical domains that are to be excluded from the multicast replication based on the content of the generated ingress replication context.

17 Claims, 9 Drawing Sheets

FLEXIBLE PACKET REPLICATION AND FILTERING FOR MULTICAST/BROADCAST

BACKGROUND

Multicast replication is useful for efficiently delivering packets to a specific group of network destinations. However, unlike broadcast replication that is destined for all available destinations, multicast replication is targeted at only a certain subset of the destinations. In other words, some of the available destinations need not receive the replicated packets and can be excluded from the multicast traffic. Delivering packets to destinations that are not in the multicast group generates redundant network traffic that degrades network performance.

Even if the replicated packets were successfully limited to the destinations specified by the multicast group, multicast replication often generates redundant traffic regardless, such as when multiple copies of a same multicast packet due to network topology end up on a same network node, even though only one copy is needed.

SUMMARY

Some embodiments of the invention provide a method for replicating and filtering multicast packet in a physical network. Upon receiving a packet, the method generates a set of metadata as ingress replication context for the received packet based on the content of the receive packet. The generated ingress replication context in some embodiments includes a multicast group identifier, a replication identifier, a first layer exclusion identifier, and a second layer exclusion identifier. The method performs multicast replication of the packet by identifying logical ports and/or logical domains that are to be excluded from the multicast replication based on the content of the generated ingress replication context.

In order to interpret the ingress replication context, some embodiments provide a multicast mapping data structure for mapping the content of the ingress replication context into identifications of logical ports and/or logical domains to include or exclude from the multicast replication (i.e., to prune off certain network destinations from multicast). In some embodiments, the data structure includes a multicast tree for each multicast group. Each multicast tree includes a set of multicast processing nodes (MPNs). Each MPN is associated with a replication ID, a multicast node exclusion ID, and a set of logical port identifiers. Some embodiments perform multicast replication by using the parameters of the replication context to traverse the multicast mapping data structure, specifically by (i) using the multicast group ID of the replication context to identify a corresponding multicast tree, (ii) using the first layer exclusion ID to identify and exclude MPNs, (iii) using replication ID to identify specific MPNs, and (iv) using the second layer exclusion ID to identify and exclude logical ports.

In some embodiments, a multicast tree of a multicast group can direct multicast traffic to one of a group of possible destinations/next hops, such as for ECMP (equal cost multiple path) or load balancing purposes. In some of these embodiments, a MPN of a multicast tree can be associated with a group of different alternative network destinations, where the replication engine can select one of the alternative network destinations for delivering a copy of the multicast packet. In some embodiments, such selection is based on a hash of the content of the multicast packet. In some embodiments, the replication context includes hash values that are used by the replication engine to select a destination from a group of destinations. In some embodiments, two or more MPNs are grouped together within a multicast tree such that the replication engine would perform ECMP and select one of the MPNs in the group for multicast replication. In some embodiments, each of such groupings of MPNs is associated with a distribution MPN for dispatching traffic to one of the MPNs in the grouping.

In order to implement multicast replication that excludes certain specified ports or logical domains, the multicast mapping structure of some embodiments specifies, for each multicast group, which ports and/or logical domains should be excluded when encountering a packet coming from a particular logical domain or logical port.

In some embodiments, a MPN's node exclusion ID corresponds to a condition that when met, the multicast replication would exclude the set of ports associated with the MPN. In some embodiments, the exclusion ID corresponds to the identities of a set of logical domains, and the condition for exclusion is met when the packet is from or destined for one of the domains represented by the exclusion ID. In some of these embodiments, a replication context generator (e.g., 110) maps the source or destination logical domain of the packet into the first layer exclusion ID of the packet's replication context. Some embodiments map the identifier of a particular segment of the network to a replication ID so that packets sourced from or destined for the particular segment can be included or excluded from multicast replication by invoking the replication ID. Some embodiments map the second layer exclusion ID in the replication context of a packet to particular ports in the network in order to exclude those particular ports from multicast replication.

In some embodiments, the exclusion IDs and the replication IDs of the replication context and of the multicast mapping data structure are defined or assigned according to a topology of a network in order to prevent or minimize the generation and transmission of redundant replicated packet. Some embodiments prevent redundant multicast traffic by excluding the input port of the received multicast packet from receiving a replica of the multicast packet. Some embodiments prevent redundant multicast traffic by excluding dually connected ports from receiving a replicated packet.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a method for replicating and filtering multicast packet in a physical network. Upon receiving a packet, the method generates a set of metadata as ingress replication context for the received packet based on the content of the receive packet. The generated ingress replication context in some embodiments includes a multicast group identifier, a replication identifier, a first layer exclusion identifier, and a second layer exclusion identifier. The method performs multicast replication of the packet by identifying logical ports and/or logical domains that are to be excluded from the multicast replication based on the content of the generated ingress replication context.

I. Multicast Mapping Data Structure

In order to interpret the ingress replication context, some embodiments provide a multicast mapping data structure for mapping the content of the ingress replication context into identifications of logical ports and/or logical domains to include or exclude from the multicast replication (i.e., to prune off certain network destinations from multicast). In some embodiments, the data structure includes a multicast tree for each multicast group. Each multicast tree includes a set of multicast processing nodes (MPNs). Each MPN is associated with a replication ID, a multicast node exclusion ID, and a set of logical port identifiers. Some embodiments perform multicast replication by using the parameters of the replication context to traverse the multicast mapping data structure, specifically by (i) using the multicast group ID of the replication context to identify a corresponding multicast tree, (ii) using the first layer exclusion ID to identify and exclude MPNs, (iii) using replication ID to identify specific MPNs, and (iv) using the second layer exclusion ID to identify and exclude logical ports.

Figure 1:
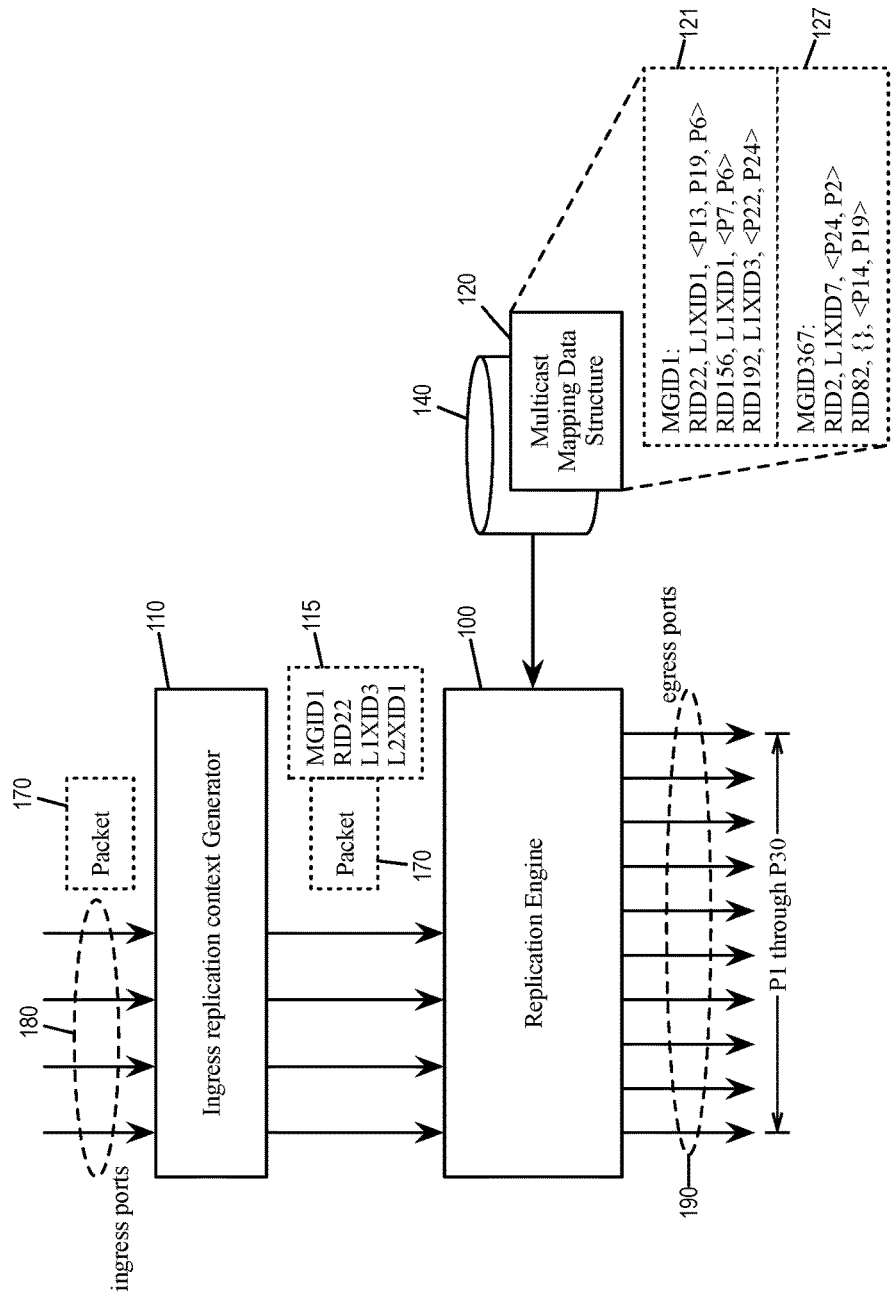
FIG. 1 illustrates performing multicast replication of a packet by generating an ingress replication context for the packet and by using a multicast mapping data structure to identify ports that are to be excluded from multicast replication.

For some embodiments, FIG. 1 illustrates performing multicast replication of a packet by generating an ingress replication context for the packet and by using a multicast mapping data structure to identify ports that are to be excluded from multicast replication. The figure illustrates a replication engine 100 receiving a packet 170 from one of its ingress ports 180 and deciding which of its egress ports 190 should and should not receive a copy of the packet 170 under multicast replication. An ingress replication context generator 110 generates an ingress replication context 115 based on the content of the packet 170 and/or based on the identities of the ingress port through which the packet arrive at the replication engine 100. The replication engine 100 in turn uses a multicast mapping data structure 120 to interpret the generated replication context 115 in order to identify the egress ports to replicate the packet.

In some embodiments, the replication engine 100 is a forwarding element (or part of a forwarding element) in a physical network. Such a forwarding element can be a logical forwarding element such as a logical switch, a logical router, or some other types of packet forwarding network entity or construct. In some embodiments, such a forwarding element is implemented by one computing device, or implemented in a distributive manner across multiple computing devices. In some the logical forwarding element is provided by software executing on the one or more computing devices, software such as hypervisors for hosting virtual machines (also known as virtual machine monitor or virtualization software). In some embodiments, the logical forwarding element is a programmable switch, such as those implemented according to the OpenFlow standard.

The replication engine 100 has a set of logical ports for receiving packets from and transmitting packets to other network entities (such as other switches, routers, virtual machines, tunnel endpoints, gateways, etc.). These logical ports includes ingress ports and egress ports. FIG. 1 conceptually illustrates the egress ports and ingress ports as separate ports, though in some embodiments some of the logical ports are for both egress and ingress. For example, the ingress port 180 through which the replication engine receives the packet 170 can be the same logical port as one of the egress ports 190.

The ingress replication context generator 110 generates the ingress replication context 115 based on the content of the packet 170. In some embodiments, the ingress replication context generator is a separate software or hardware module from the replication engine 100. In some embodiments, the replication context generator 115 and the replication engine 100 are both part of a same logical forwarding element. In some embodiments, software running on computing devices implementing the replication engine as well as the ingress replication context generator 110.

As illustrated, the generated replication context includes the following parameters: multicast group ID "MGID1", replication ID "RID22", first layer exclusion ID "L1XID3", and second layer exclusion ID "L2XID1". In some embodiments, different embodiments derive these parameters based on differently information for different use cases. For example, some embodiments derives the replication ID from outer bridge domain, the first layer exclusion ID from inner bridge domain, and the second layer exclusion ID based on identity of the ingress port through which the packet arrives at the replication engine (i.e., the ingress port 180).

The multicast mapping data structure 120 stores various multicast trees for various multicast groups, such as a multicast tree 121 for the multicast group with ID "MGID1" and a multicast tree 127 for a multicast group with ID "MGID367". In some embodiments, these multicast trees of the multicast mapping data structure 120 are stored in a replication database memory (RDM) 140. In some embodiments, the replication engine 100 uses the multicast group ID in the ingress replication context 110 to accesses/identifies/index/retrieves the corresponding multicast tree. In this example, the multicast ID "MGID1" of the replication context 115 is used to identify the multicast tree 121.

As illustrated, the multicast tree 121 has three MPNs that correspond to replication IDs "RID22", "RID156", and "RID192", while the multicast tree 127 has two MPNs that correspond to replication IDs "RID2" and "RID82". Each of these MPNs corresponds a multicast node exclusion ID, and a set of logical port identifiers. For example, the MPN with replication ID "RID22" has multicast exclusion ID "L1XID1" and identifiers for logical ports P13, P19, and P6, and the MPN with replication ID "RID2" has multicast exclusion ID "L1XID7" and identifiers for logical ports P24 and P2. In some embodiments, a MPN can be without a multicast node exclusion ID, such as the MPN with replication ID "RID82".

Figure 2:
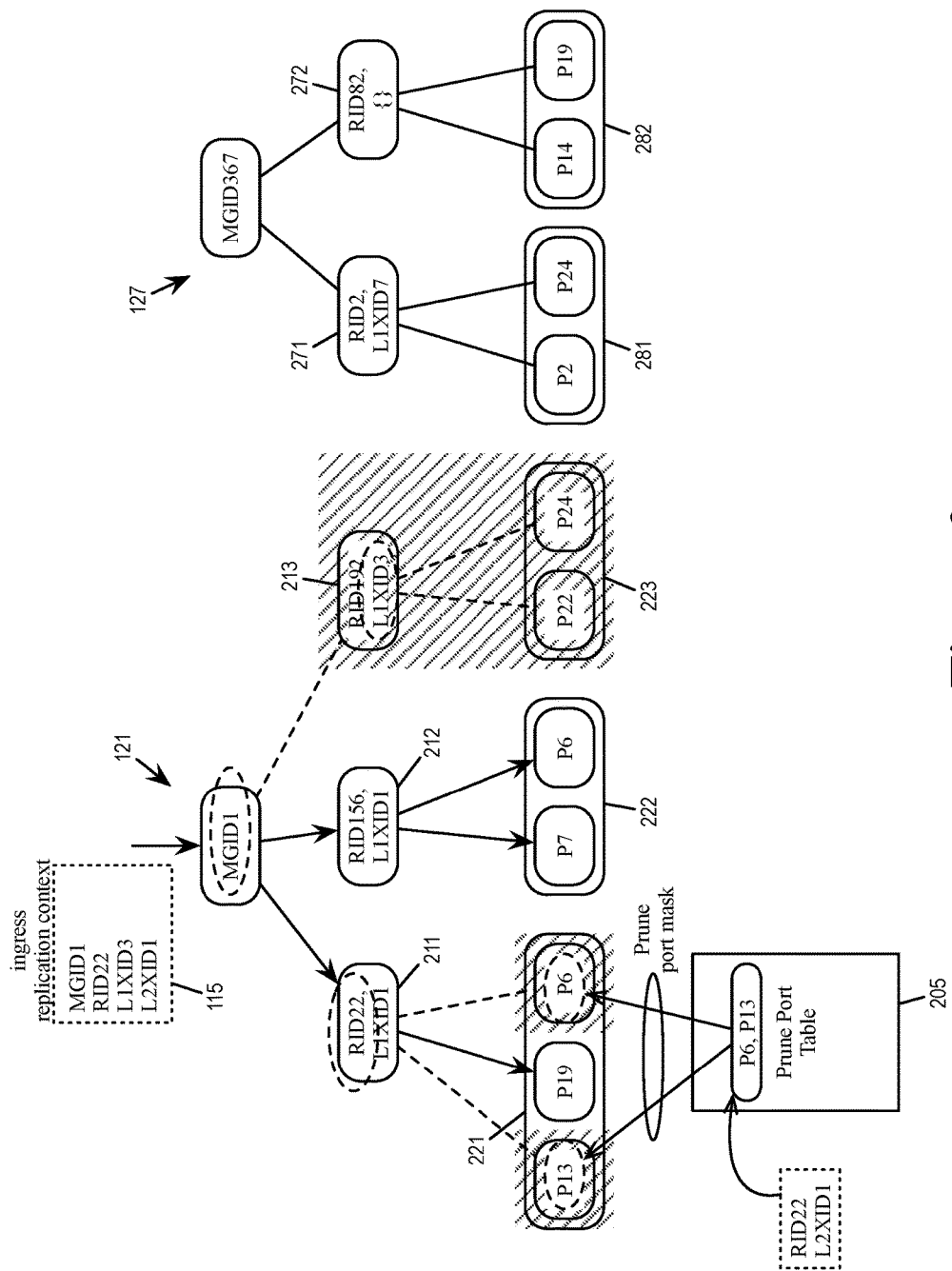
FIG. 2 illustrates using multicast trees to perform multicast replication by identifying destinations that are to be included and/or excluded from receiving copies of the multicast replicated packet.

For some embodiments, FIG. 2 illustrates using multicast trees to perform multicast replication by identifying destinations that are to be included and/or excluded from receiving copies of the multicast replicated packet. The figure conceptually illustrates the MPNs of the multicast trees 121 and 127. The multicast tree 121 has MPNs 211-213, and the multicast tree 127 has MPNs 271-272. The MPNs 211-213 are associated with port sets 221-223, respectively. The MPNs 271 and 272 are associated with port sets 281-282, respectively.

Since the replication context 115 specifies multicast group "MGID1", the replication engine traverse corresponding multicast tree 121. In some embodiments, the replication engine uses a multicast index memory (MIM) to map the multicast group ID of the replication context to an MPN in the multicast tree. In this case, the replication engine starts traversing the multicast tree 121 at the MPN 211.

As mentioned, in some embodiments, the replication engine uses the first layer exclusion ID of the replication context to identify and exclude MPNs with matching node exclusion ID. In this case, the first layer exclusion ID of the replication context "L1XID3" matches the multicast node exclusion ID of the MPN 213. The replication engine correspondingly excludes all structures and destination (such as logical ports) of the MPN 213 from receiving copies of the replicated packets for the multicast group "MGID1" (e.g., the packet 170). In this case, this means ports "P22" and "P24" (i.e., the port set 223) would not receive replicated packet.

In some embodiments, the replication engine also uses the replication ID and the second layer exclusion of the replication context to identify a specific MPN and to identify and exclude certain logical ports associated with the identified MPN. In this case, the replication ID "RID22" of the replication context matches the replication ID of the MPN 211, which is associated with logical ports "P13", "P9" and "P6" in the port set 221. The replication engine then uses the second layer exclusion ID "L2XID1" of the replication context to identify the ports associated with the MPN 211 that are to be excluded from multicast replication of "MGID1". In this example, the ID "L2XID1" maps to logical ports "P13" and "P6" in the port set 221 under the MPN 211. In some embodiments, such mapping is by looking up a prune port table 205, which maps the second layer exclusion ID "L2XID1" into a prune port mask that exclude ports "P13" and "P6" from multicast replication while including the port "P19". In some embodiments, this mapping is further based on the replication ID.

For MPNs whose replication IDs do not match that of the replication context and does have a multicast node exclusion ID that matches the first layer exclusion ID, some embodiments include all structures/destinations/ports associated with the MPN for the multicast replication without examining any second layer exclusion ID. For example, the MPN 212 has replication ID "RID156" and multicast node exclusion ID "L1XID1" that do not match the replication ID "RID22" and first layer exclusion ID "L1XID3" of the replication context. Consequently, the multicast replication according to the replication context 170 would include all destination/ports associated with an MPN 212. On the other hand, in some other embodiments, MPNs whose replication IDs do not match that of the replication context would be entirely excluded from the multicast replication.

Figure 3:
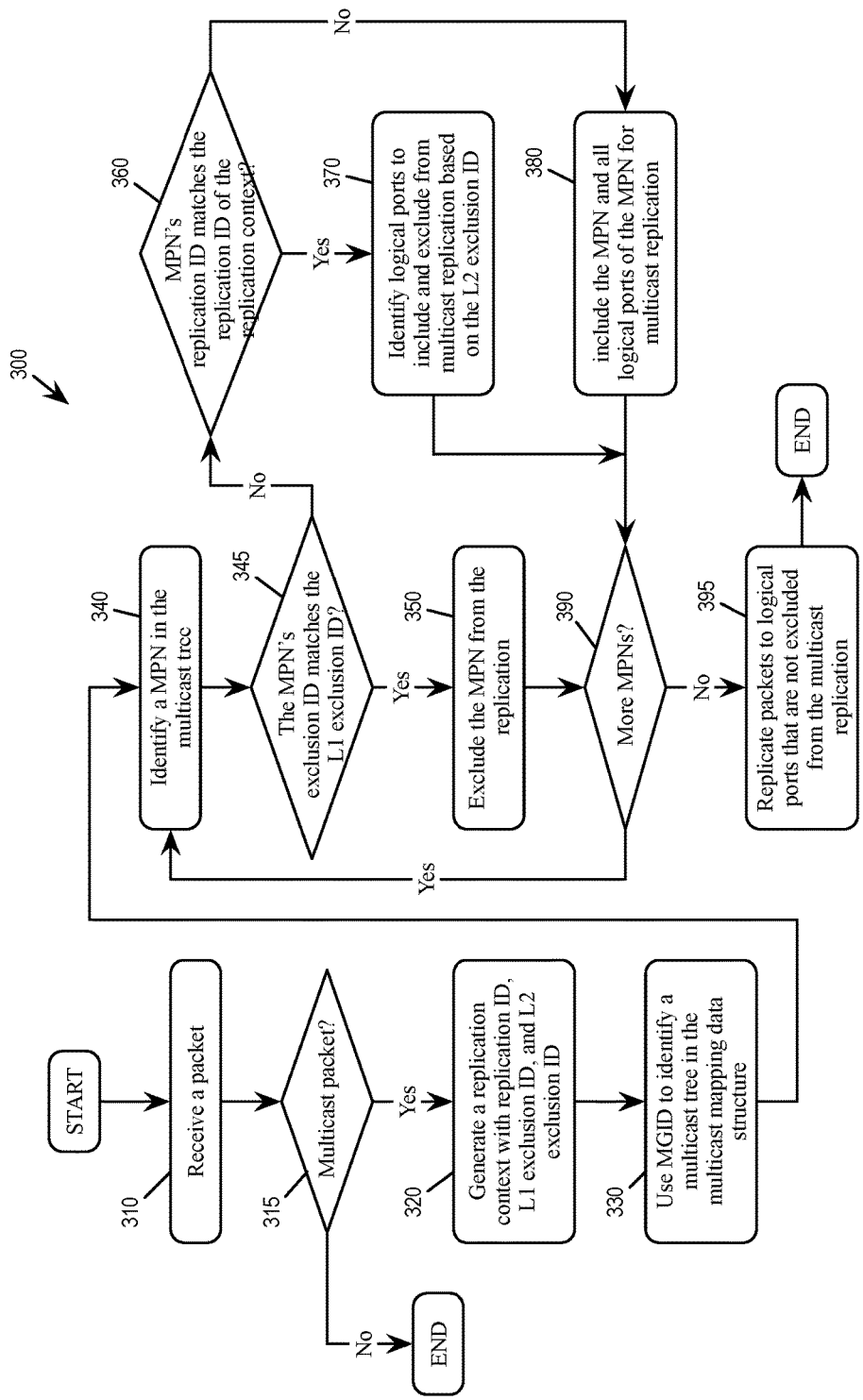
FIG. 3 conceptually illustrates a process for performing multicast replication by using a replication context and a multicast mapping data structure.

FIG. 3 conceptually illustrates a process 300 for performing multicast replication by using a replication context and a multicast mapping data structure. In some embodiments, a replication engine such as the replication engine 100 performs the process 300. In some embodiments, a computing device performing switching or routing operations performs the process 300 when it performs multicast operations.

The process 300 starts when it receives (at 310) a packet. This packet can be an encapsulated packet of an overlay logical network (such as VXLAN or VLAN) with inner header and encapsulation header, or a plane Ethernet packet with just an inner header. The process then determines (at 315) whether the packet is a multicast packet. Some embodiments make this determination by examining the address fields for addresses that correspond to a multicast group. Some embodiments also look for addresses that correspond to broadcast. If the packet is a multicast packet belonging to a multicast group (or a broadcast packet, or a unknown unicast packet that needs to be flooded in the network), the process proceeds to 320. Otherwise the process ends.

At 320, the process generates a replication context based on the content of the packet. Such context (such as the replication context 110) in some embodiments includes a multicast group identifier, a replication ID, a first layer exclusion ID, and a second layer exclusion ID. Next, the process uses (at 330) the multicast group identifier (MGID) of the replication context to identify a corresponding multicast tree from a multicast mapping structure. In some embodiments, each multicast tree includes one or more multicast processing nodes (MPNs), and the MGID is used as an index to locate a MPN in the corresponding multicast tree.

The process then identifies (at 340) a MPN in the multicast tree. The process then determines (at 345) if the exclusion ID of the identified MPN matches the first layer exclusion ID of the replication context. If there is a match between the exclusion IDs, the process proceeds to 350. If there is no match, the process proceeds to 360.

At 350, the process excludes the MPN from the multicast replication of the multicast group, i.e., the copies of the packet will not be sent to any associated ports and destinations of the MPN under multicast replication. The process then proceeds to 390.

At 360, the process determines whether the replication ID of the replication context matches the replication ID associated with the MPN. If so, the process proceeds to 370. If the replication ID of the replication context (i.e., of the packet) does not match that of the MPN, the process proceeds to 380.

At 370, the process identifies logical ports associated with the MPN that are to be excluded and/or included for the multicast replication of the multicast group based on the second layer exclusion ID of the replication context. Some embodiments map the second layer exclusion ID to a bitmask that prevents certain logical ports from receiving the multicast traffic. The process then proceeds to 390. In some embodiments, this mapping is further based on the replication ID.

At 380, the process includes the MPN and all of its associated logical ports as destinations that will receive a copy of the multicast replicated packet for the multicast group. In some other embodiments, an MPN whose replication ID does not match that of the replication context would be entirely excluded (i.e., pruned off) from multicast replication. The process then proceeds to 390. Some embodiments do not perform the operation 380 but rather proceeds directly to 390.

At 390, process determines if there is another MPN in the multicast tree. If so, the process proceeds to 340 in order to process the replication context according to the next MPN. Otherwise, the process proceeds to 395.

At 395, the process replicates the received packet to logical ports that are not excluded (or pruned off) from multicast multiplication. In some embodiments, a MPN whose replication ID does not match that of the replication context would be entirely included in the multicast traffic since it is not excluded by either of the exclusion IDs. The process 300 then ends.

In some embodiments, a multicast tree of a multicast group can direct multicast traffic to one of a group of possible destinations/next hops, such as for ECMP (equal cost multiple path) or load balancing purposes. In some of these embodiments, a MPN of a multicast tree can be associated with a group of different alternative network destinations, where the replication engine can select one of the alternative network destinations for delivering a copy of the multicast packet. In some embodiments, such selection is based on a hash of the content of the multicast packet. In some embodiments, the replication context includes hash values that are used by the replication engine to select a destination from a group of destinations. In some embodiments, two or more MPNs are grouped together within a multicast tree such that the replication engine would perform ECMP and select one of the MPNs in the group for multicast replication. In some embodiments, each of such grouping of MPNs is associated with a distribution MPN for dispatching traffic to one of the MPNs in the grouping.

Figure 4:
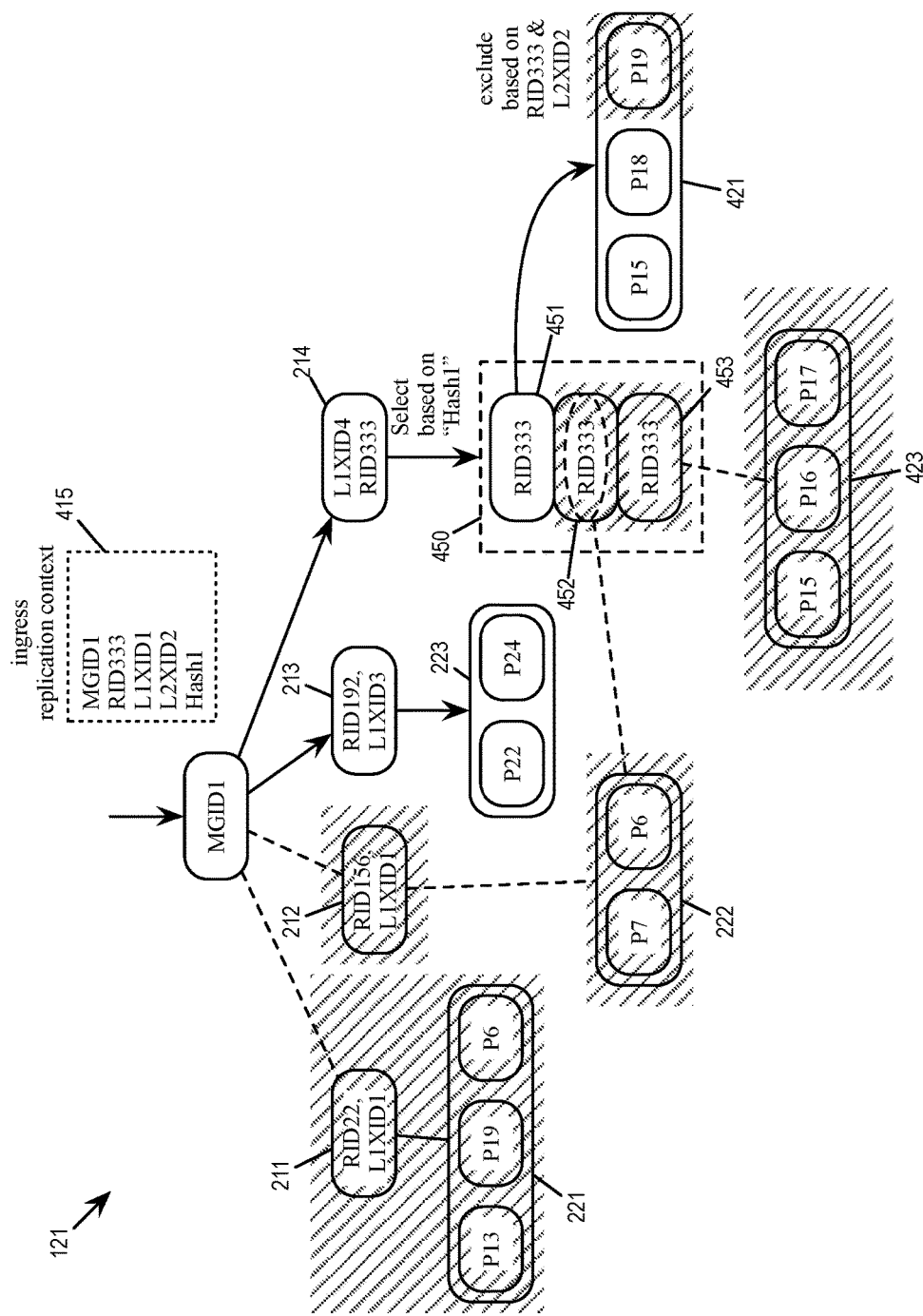
FIG. 4 illustrates a multicast tree that includes a distribution MPN for distributing multicast traffic to MPNs in a grouping of MPNs.

FIG. 4 illustrates a multicast tree that includes a distribution MPN for distributing multicast traffic to MPNs in a grouping of MPNs. As illustrated, the multicast tree 121 for the multicast group "MGID1" has the MPNs 211, 212, and 213, each with its own associated RID, exclusion ID, and a set of ports. In addition, the multicast tree 121 has a distribution MPN 214. The distribution MPN 214 is for distributing the multicast traffic to a grouping 450 of MPNs 451-453 based on ECMP or load balancing.

The distribution MPN 214 is associated with a multicast node exclusion ID "L1XID4". The distribution MPN 214 and its associated grouping of MPNs 450 are also associated with the replication ID "RID333". Each of the MPNs in the grouping 450 is also associated with a set of ports. The MPN 451 is associated with a port set 421 that includes "P15", "P18" and "P19". The MPN 453 is associated with a port set 423 that includes "P15", "P16", and "P17". In some embodiments, different MPNs (including MPNs in a distribution grouping) can be associated with a same port set. As illustrated in the example of FIG. 4, the MPN 452 is associated with the port set 222, which is also associated with the MPN 212.

As illustrated, the replication engine has received a multicast packet (not illustrated) and generated a corresponding replication context 415. The replication context includes the following parameters: multicast group ID "MGID1", replication ID "RID333", first layer exclusion ID "L1XID1", and second layer exclusion ID "L2XID2". In addition, the replication context also includes a hash value "hash1", which is derived from the content of the multicast packet in some embodiments.

When the replication engine processes the replication context based on the multicast tree 121, the first layer exclusion ID "LXID1" excludes the MPNs 211 and 212, as they both have the matching node exclusion ID "LXID1". Since the MPN 213 and the distribution MPN 214 have exclusion IDs that do not match the first layer exclusion ID of the multicast (the MPN 213's exclusion ID is "L1XID3" and the distribution MPN 214's exclusion ID is "L1XID4"), they are not excluded from multicast traffic.

The distribution MPN 214 is a node for distributing multicast traffic among the MPNs in the grouping 450 by using the hash value "value1" in the replication context 415 to select a subset (e.g., only one MPN) of the MPNs 451-453 in the grouping. In this example, the MPN 451 is selected based on the hash value "value1" for receiving multicast traffic, while the MPNs 452 and 453 are not. Since the replication ID "RID333" of the replication context matches that of the distribution MPN 214 and its associated group of MPNs, the second layer exclusion ID "L2XID2" is used to determine which of the ports associated with the MPN 451 will be pruned off/excluded from receiving the multicast traffic. (In this example, the port "P19" is excluded from multicast by "L2XID").

In some embodiments, some of the ports associated with a MPN belong to one or more link aggregate groups (LAGs). In some embodiments, a LAG is a group of physical ports that are bundled or combined together to make a single high-bandwidth data path, so as to implement the traffic load sharing among the member ports in the group and to enhance connection reliability.

In some of these embodiments, a MPN in a multicast tree is associated with one or more LAG nodes, each associated LAG node comprising an identifier (e.g., an index) for identifying a set of ports that belong to the bundle of ports of the LAG. Some embodiments use the LAG identifier to map and identify individual ports in the bundle for inclusion or exclusion for the multicast replication (e.g., by generating a pruning bitmask based on the second layer exclusion ID).

Figure 5:
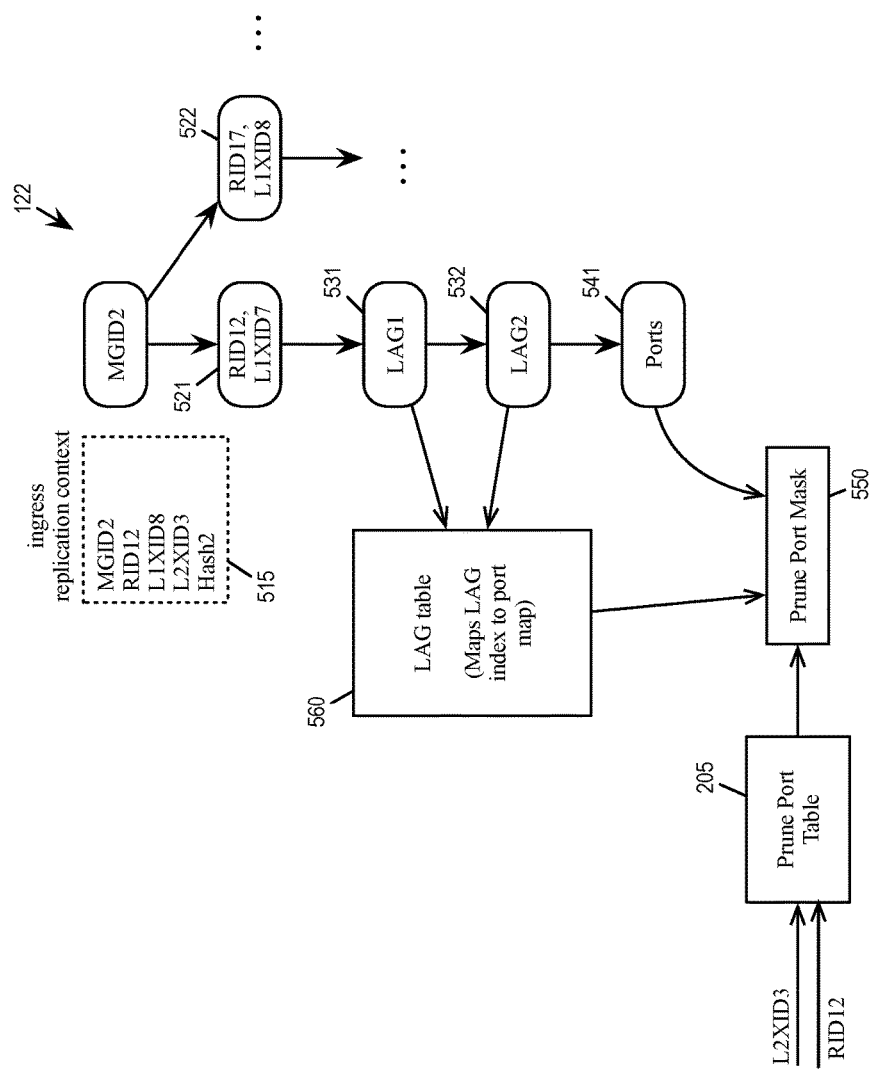
FIG. 5 illustrates a multicast tree that uses LAG identifiers to identify individual ports for multicast replication.

FIG. 5 illustrates a multicast tree that uses LAG identifiers to identify individual ports for multicast replication. As illustrated, the replication engine has received a replication context 515, which specifies multicast group ID "MGID2", replication ID "RID12", first layer exclusion ID "L1XID8" and second layer exclusion ID "L2XID3". In addition, the replication context 515 also includes a hash value "hash2".

Based on the multicast group ID "MGID2" of the context, the replication engine identifies a multicast tree 122 from the multicast mapping data structure. The multicast tree 122 has MPNs 521, 522. The MPN 521 is associated with a set of ports 541, as well as two LAGs 531 and 532 (LAG1 and LAG2). The MPN 522 has exclusion ID "L1XID8", which matches the first layer exclusion ID of the replication context and is therefore excluded from multicast replication. The MPN 521 has a non-matching exclusion ID ("L1XID7") and a matching replication ID ("RID12"), the replication engine therefore examines the ports of the MPN to include and/or exclude specific ports for multicast replication.

The replication engine then uses the identifiers of LAG1 531 and LAG2 532 to look up the identities of the member ports from a LAG table 560. Thus, the member ports of the port set 541 and the member ports of LAGs 531 and 532 together form a complete set of ports that are associated with the MPN 521. This allows the replication engine to map the second layer exclusion ID ("L2XID3") from the replication context to include or exclude specific ports from the complete set of ports of the MPN 521 for multicast replication (by looking up the prune port table 205 and by generating a prune port mask 550). In some embodiments, such mapping is further based on the replication ID.

In some embodiments, member ports of a LAG form a grouping for distributing multicast traffic load (for load balancing purposes). In some of these embodiments, the distribution is based on a hash value (e.g., "hash2" supplied by the replication context), wherein the replication engine uses the hash value to select one or a subset of ports in a LAG for multicast replication.

II. Use Cases

In order to implement multicast replication that exclude certain specified ports or logical domains, the multicast mapping structure of some embodiments specifies, for each multicast group, which ports and/or logical domains should be excluded when encountering a packet coming from a particular logical domain or logical port.

In some embodiments, a MPN's node exclusion ID corresponds to a condition that when met, the multicast replication would exclude the set of ports associated with the MPN. In some embodiments, the exclusion ID corresponds to the identities of a set of logical domains, and the condition for exclusion is met when the packet is from or destined for one of the domains represented by the exclusion ID. In some of these embodiments, a replication context generator (e.g., 110) maps the source or destination logical domain of the packet into the first layer exclusion ID of the packet's replication context. Some embodiments map the identifier of a particular segment of the network to a replication ID so that packets sourced from or destined for the particular segment can be included or excluded from multicast replication by invoking the replication ID. Some embodiments map the second layer exclusion ID in the replication context of a packet to particular ports in the network in order to exclude those particular ports from multicast replication.

In some embodiments, the exclusion IDs and the replication IDs of the replication context and of the multicast mapping data structure are defined or assigned according to a topology of a network in order to prevent or minimize the generation and transmission of redundant replication packet. Some embodiments prevent redundant multicast traffic by excluding the input port of the multicast packet from receiving any packet replicated by the replication engine.

Figure 6:
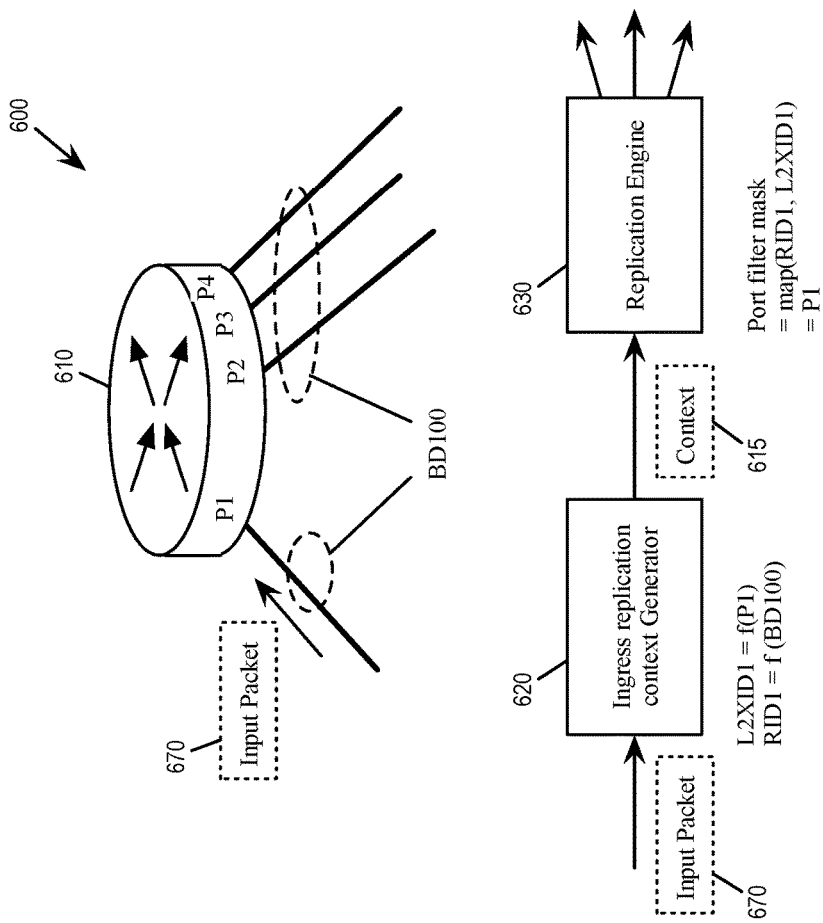
FIG. 6 illustrates an example assignment of exclusion IDs and replication IDs for preventing sending a replicated packet back to its source.

FIG. 6 illustrates an example assignment of exclusion IDs and replication IDs for preventing sending a replicated packet back to its source. The figure illustrates an example network segment 600 for which the multicast replication is controlled by multicast mapping data structure. The network segment 600 includes a switch 610 that has four ports "P1", "P2", "P3", and "P4". The switch 610 has received a packet 670, which is a multicast packet requiring multicast replication by the switch 610. The packet 670 arrives at the switch 610 through the port "P1" (so "P1" is the input port). The ports "P1", "P2", "P3", and "P4" belong to a same bridge domain (BD) with identifier "BD100".

An ingress replication context generator 620 process the packet 670 to create a replication context 615, which is used by the replication engine in deciding which port should be included or excluded from multicast replication of the packet 670. The context has a layer 2 exclusion ID "L2XID1", which is derived from the identity of input port "P1". Its replication ID "RID1" is derived from the bridge domain identifier "BD100". Upon reception of the replication context, 615, the replication engine 630 maps the replication ID "RID1" and the second layer exclusion ID "L2XID1" into a port filter mask that allow replication to ports "P2", "P3", and "P4" of the bridge domain BD100 while excluding the port "P1". Though not illustrated, a multicast packet of the same multicast group arriving at the switch 610 through the port "P2" would have a different second layer exclusion ID that causes the replication engine 630 to exclude the port "P2" from multicast replication within the bridge domain BD100. This mechanism therefore ensures that the replication engine would always exclude the input port of a multicast packet from receiving replicated packet, thereby avoiding redundant multicast packet.

Some embodiments prevent redundant multicast traffic by excluding a port that is connected to a dually connected network node. A dually (or multiply) connected network node is one that is connected to two (or more) multicast switches or routers. In other words, such dually connected network node would receive the same replicated packet from two or more multicast packet replicators. In these instances, an ingress replication context generator in some embodiments would exclude a port that is connected to a dually (or multiply) connected network node from receiving replicated packets.

Figure 7:
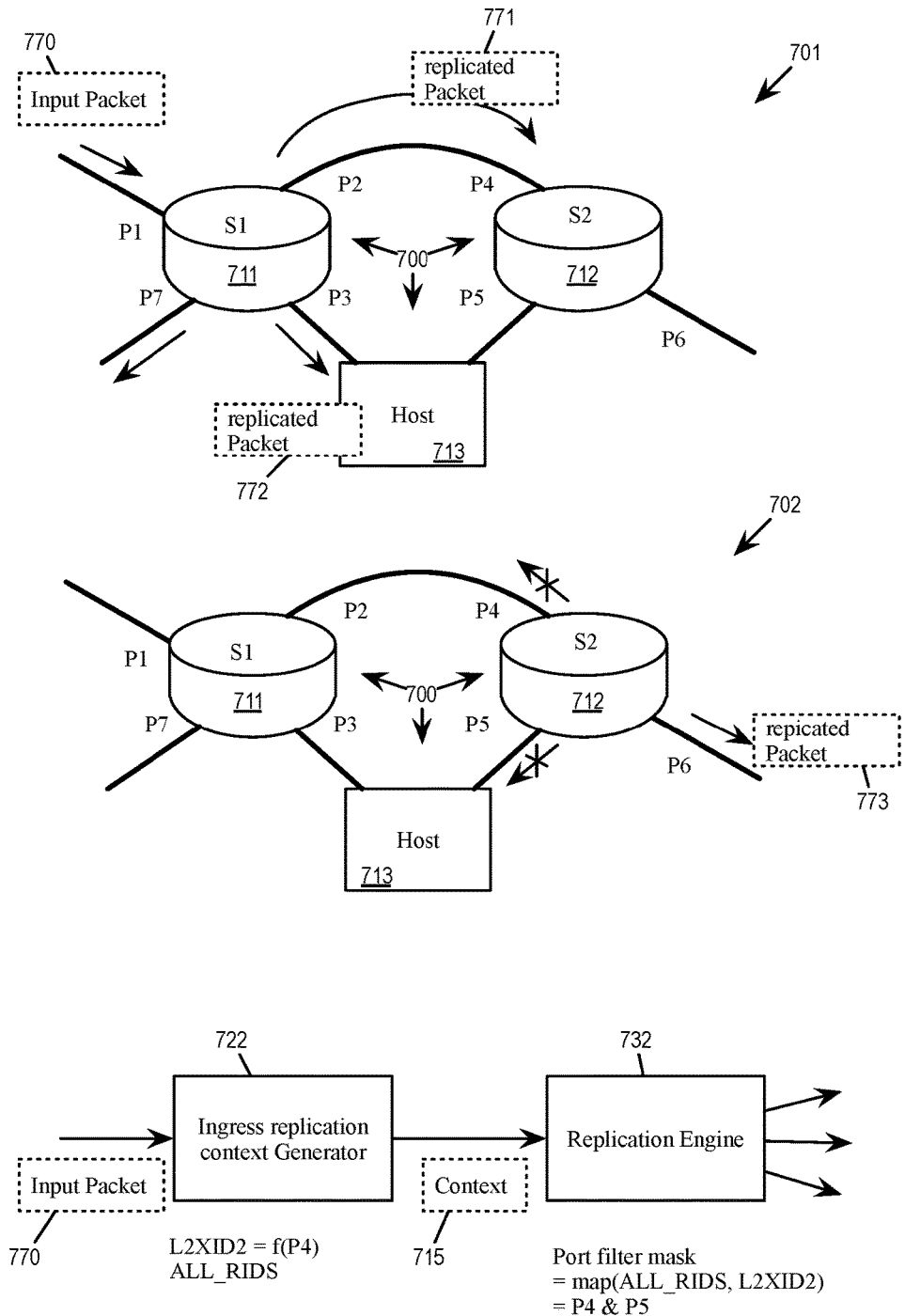
FIG. 7 illustrates an example assignment of exclusion IDs and replication IDs for excluding dually connected ports.

FIG. 7 illustrates an example assignment of exclusion IDs and replication IDs for excluding dually connected ports. The figure illustrates an example network segment 700 for which the multicast replication is controlled by multicast mapping data structure. The network segment 700 includes a switch 711 (S1), a switch 712 (S2), and a host machine 713. The switch S1 has four ports "P1", "P2", "P3", and "P7". The switch S2 has three ports "P4", "P5", and "P6". The host 713 is a dually connected network node that is connected to both switches S1 and S2, specifically to the switch S1 at the port P3 and to the switch S2 at the port P5. The figure illustrated the replication of a packet 770 by S1 and S2 in two stages 701-702.

The stage 701 shows the replication by the switch S 1. The switch S1 replicates the packet 770 for egress port P2 as a replicated packet 771 for the switch S2. The switch S1 also replicates the packet 770 for egress port P3 as a replicated 772 for the host 713.

The stage 702 shows the replication by the switch S2. The switch S2 replicates the packet 771 to egress port P6 but not to egress ports P4 and P5. The port P4 is pruned off from the multicast replication because it goes to the source of a replicated packet (i.e., 771), while the port P5 is pruned off because it goes to a dually connected network node (i.e., the host 713) that is already receiving a replicated packet (i.e., 772) from another source (i.e., S1).

The switch S2 has an ingress replication context generator 722 and a replication engine 732. The ingress replication context generator 722 maps the port "P4" into a second layer exclusion ID "L2XID2" in a replication context 715. The replication engine 732 in turn maps the second layer exclusion ID "L2XID2" in the context 715 to a port filter mask that exclude both P4 and P5, as both P4 and P5 belong to a same list of ports to be pruned off.

In some embodiments, a packet to be replicated can be an encapsulated packet having inner and outer headers. Some embodiments perform two looks ups for encapsulated packets, a first lookup based on the outer header to provide an outer replication context and a second lookup based on the inner header to provide an inner replication context. For a non-encapsulated packet with only inner header, some embodiments generate inner replication context based on the inner header. In some embodiments, replica packets from the inner replication context may contain duplicates of outer replication context and need to be pruned. Some embodiments therefore maps an inner bridge domain identifier (e.g., VLAN tag or VLAN ID) of a packet to a first layer exclusion ID and outer bridge domain identifier (e.g., VXLAN ID) of a encapsulated packet into a replication ID. A replication engine in some embodiments uses such a first layer exclusion ID to prune off certain inner bridge domains from multicast replication.

In some embodiments, the multicast traffic pruning described above are used to ensured that, in a VPLS (Virtual Private LAN Service) environment, a packet forwarded from a provider edge (PE) device is never forwarded to another provider edge device. In some of these embodiments, the identity of the input port through which a packet arrives at a provider edge is mapped into a first layer exclusion ID. The replication engine has a multicast mapping structure that maps the first layer exclusion ID to a set of MPNs that correspond to a set of replications toward the VPLS core.

III. Packet Switching Pipeline

In some embodiments, the replication context generation and the actual packet replication using multicast mapping structure is performed at a packet switching pipeline.

Figure 8:
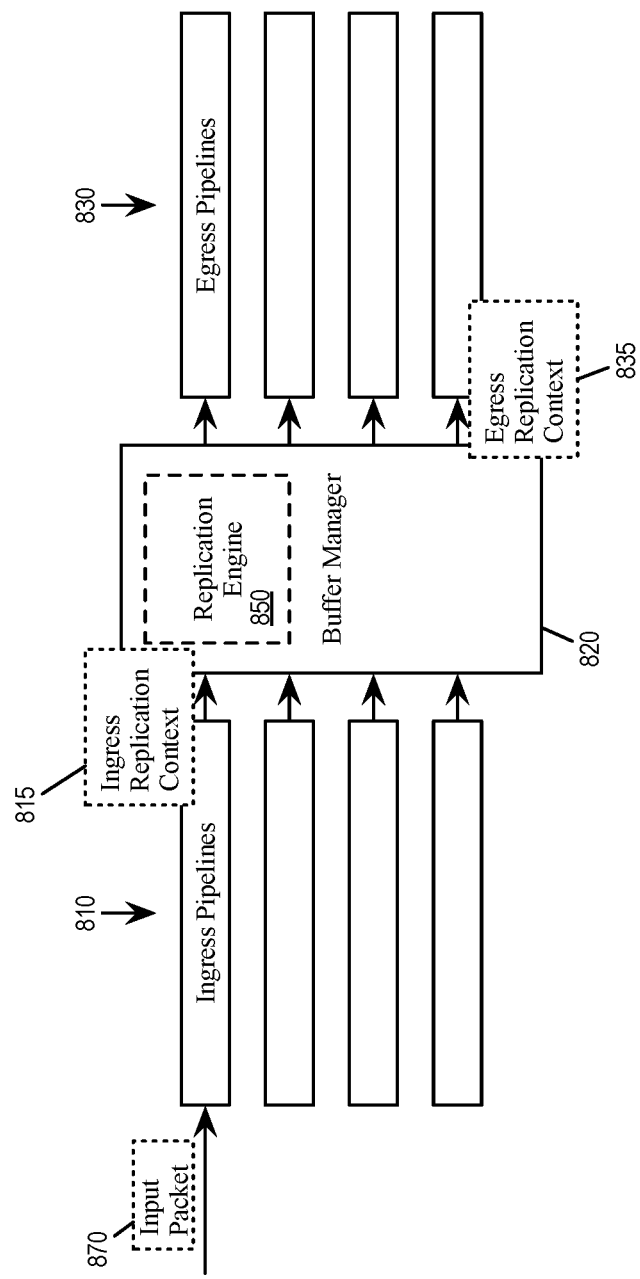
FIG. 8 illustrates an example packet-processing pipeline 800 that performs flexible packet replication FIG. 9 conceptually illustrates an electronic system with which some embodiments of the invention are implemented.

FIG. 8 illustrates an example packet-processing pipeline 800 that performs flexible packet replication as described in Sections I and II above. As illustrated, the packet-processing pipeline 800 includes ingress pipelines 810, a buffer manager 820, and egress pipelines 830. In some embodiments, the packet-processing pipeline 800 is a match-action packet-processing pipeline that includes match action stages in ingress pipelines 810 as well as in egress pipelines 830. In some embodiments, the match-action pipelines perform processing tasks such as L2 processing, L3 process, access control list (ACL), and other operations. Further descriptions of match-action packet processing circuits of the ingress and egress pipelines (such as OpenFlow processing circuits) can be found in U.S. Patent Application Publication No. 2014/0241361 and U.S. Patent Application Publication No. 2014/0241358. U.S. Patent Application Publication No. 2014/0241361 and U.S. Patent Application Publication No. 2014/0241358 are herein incorporated by reference.

The buffer manager 820 provides buffering of packet traffic between ingress and egress pipelines. It is also a physical packet dispatcher that provides the data paths between ingress pipelines 810 and the egress pipelines 830. As illustrated, the buffer manager 820 also includes a replication engine 850 for replicating packets that it receives from the ingress pipelines 810 to the egress pipelines 830.

As illustrated, the packet-processing pipeline receives a packet 870 at the ingress pipelines 810. The packet 870 is a multicast packet belonging to a multicast group, which causes the ingress pipelines to generate an ingress replication context 815. (Thus, the ingress pipeline is a replication context generator). The ingress replication context reaches the buffer manager 820, whose replication engine 850 processes the received ingress replication context based on its stored multicast mapping data structure that includes multicast trees for various different multicast groups. The replication engine 850 then produces an egress replication context 835, which specifies which egress ports should the packet 870 be replicated to (and which egress ports should be excluded). The buffer manager 820 then replicates the packet and delivers the replica packets to the egress pipelines 830 through the identified egress ports (that are not excluded) according to the egress replication context.

VII. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
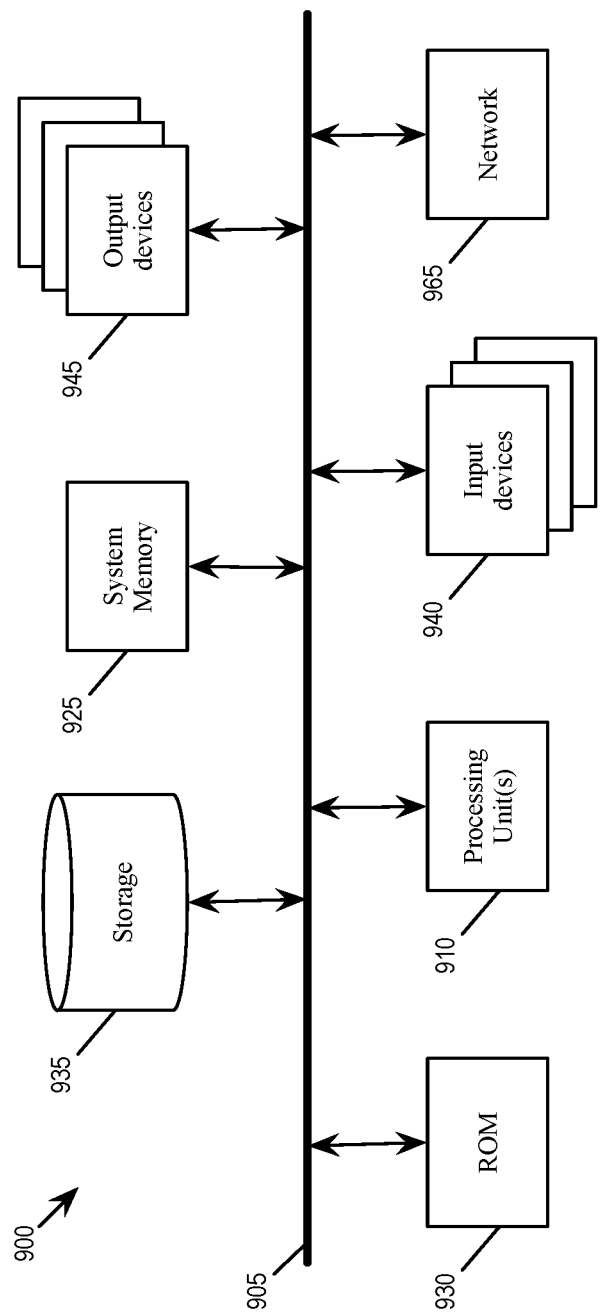

FIG. 9 conceptually illustrates an electronic system 900 with which some embodiments of the invention are implemented. The electronic system 900 can be used to execute any of the control, virtualization, or operating system applications described above. The electronic system 900 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the system memory 925, and the permanent storage device 935.

From these various memory units, the processing unit(s) 910 retrieves instructions to execute and data to process in order to execute the processes of the invention. The processing unit(s) may be a single processor or a multi-core processor in different embodiments.

The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 925 is a read-and-write memory device. However, unlike storage device 935, the system memory is a volatile read-and-write memory, such a random access memory. The system memory stores some of the instructions and data that the processor needs at runtime. In some embodiments, the invention's processes are stored in the system memory 925, the permanent storage device 935, and/or the read-only memory 930. From these various memory units, the processing unit(s) 910 retrieves instructions to execute and data to process in order to execute the processes of some embodiments.

The bus 905 also connects to the input and output devices 940 and 945. The input devices enable the user to communicate information and select commands to the electronic system. The input devices 940 include alphanumeric keyboards and pointing devices (also called "cursor control devices"). The output devices 945 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 9, bus 905 also couples electronic system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIG. 3) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for replicating and filtering multicast packets in a physical network, the method comprising:
upon receiving a multicast packet, generating a set of metadata as ingress replication context for the received packet based on a source of the received packet; and
performing multicast replication of the packet by identifying ports that are to be excluded from the multicast replication based on the generated ingress replication context,
said performing multicast replication comprising interpreting the ingress replication context based on a multicast mapping data structure for mapping the ingress replication context into identities of logical ports or logical domains to be excluded from the multicast replication,
the multicast mapping data structure comprising a multicast tree for each multicast group, each multicast tree including a set of multicast processing nodes (MPNs), each MPN associated with a replication identifier (ID), a multicast node exclusion ID, and a set of logical port identifiers, wherein the generated ingress replication context comprises a multicast group identifier, a replication identifier, a first layer exclusion identifier, and a second layer exclusion identifier.

2. The method of claim 1, wherein performing multicast replication further comprises using the multicast group ID of the replication context to identify a corresponding multicast tree.

3. The method of claim 1, wherein performing multicast replication further comprises using the first layer exclusion ID to identify and exclude MPNs.

4. The method of claim 1, wherein performing multicast replication further comprises using the replication ID to identify specific MPNs and using the second layer exclusion ID to identify and exclude logical ports.

5. The method of claim 1, wherein an MPN is further associated with a set of link aggregate groups (LAGs), each LAG for identifying a bundle of ports.

6. The method of claim 5 further comprising using a hash value to select a port from a LAG for multicast replication.

7. The method of claim 1, wherein at least one MPN of a multicast tree is a distribution MPN for selecting one MPN from among a group of MPNs.

8. The method of claim 7, wherein the replication context further comprises a hash value for selecting the one MPN from among the group of MPNs.

9. The method of claim 1, wherein a first layer exclusion ID of an MPN is based on an identifier of a particular bridge domain for preventing a replica of the received multicast packet from entering the particular bridge domain.

10. The method of claim 1, wherein the exclusion IDs and the replication IDs of the replication context and of the multicast mapping data structure are defined according to a topology of a network in order to prevent redundant replication traffic.

11. The method of claim 10, wherein preventing redundant multicast traffic comprises excluding an input port of the received multicast packet from receiving a replica of the received multicast packet.

12. The method of claim 10, wherein preventing redundant multicast traffic comprises excluding dually connected ports from receiving a replica of the received multicast packet.

13. A programmable network switch comprising:
an ingress pipeline, a buffer manager, and an egress pipeline, wherein the ingress and egress pipelines comprise a plurality of match-action circuits,
the ingress pipeline generating a replication context when it receives a multicast packet,
the buffer manager replicating the received multicast packet and delivers the replicated packets to the egress pipeline through a set of egress ports, wherein the buffer manager uses the generated ingress replication context to identify egress ports that are to be excluded from receiving the replicated packets,
the buffer manager replicating the multicast packet by interpreting the ingress replication context based on a multicast mapping data structure for mapping the content of the ingress replication context into identities of logical ports or logical domains to be excluded from the multicast replication,
the multicast mapping data structure comprising a multicast tree for each multicast group, each multicast tree including a set of multicast processing nodes (MPNs), wherein each MPN is associated with a replication ID, a multicast node exclusion ID, and a set of logical port identifiers, wherein the generated ingress replication context comprises a multicast group identifier, a replication identifier, a first layer exclusion identifier, and a second layer exclusion identifier.

14. The programmable network switch of claim 13, wherein performing multicast replication further comprises (i) using the multicast group ID of the replication context to identify a corresponding multicast tree, (ii) using the first layer exclusion ID to identify and exclude MPNs, and (iii) using the replication ID to identify specific MPNs and using the second layer exclusion ID to identify and exclude logical ports.

15. The programmable network switch of claim 13, wherein at least one MPN of a multicast tree is a distribution MPN for selecting one MPN from among a group of MPNs.

16. The programmable network switch of claim 13, wherein a first layer exclusion ID of an MPN is based on an identifier of a particular bridge domain for preventing a replica of the received multicast packet from entering the particular bridge domain.

17. The programmable network switch of claim 13, wherein a second layer exclusion ID of an MPN is based on an identifier of an input port of the received multicast packet for excluding the input port from receiving a replica of the received multicast packet.

* * * * *